United States Patent [19]
Cheron et al.

[11] Patent Number: 4,717,998
[45] Date of Patent: Jan. 5, 1988

[54] STATIC DEVICE FOR CONTROL OF ENERGY-EXCHANGE BETWEEN ELECTRICAL GENERATING AND/OR RECEIVING SYSTEMS

[75] Inventors: Yvon Cheron, Toulouse; Pierre Jacob; Jacques Salesse, both of Paris, all of France

[73] Assignee: Agence Nationale de Valorisation de la Recherche (A.N.V.A.R.), Paris, France

[21] Appl. No.: 887,929

[22] Filed: Jul. 22, 1986

[30] Foreign Application Priority Data

Jul. 22, 1985 [FR] France .................. 85 11291

[51] Int. Cl.⁴ ................... H02M 7/00; H02J 3/38
[52] U.S. Cl. ................... 363/71; 363/98; 307/82; 307/85; 307/87
[58] Field of Search ........ 363/71, 72, 95, 98; 307/82-87

[56] References Cited

U.S. PATENT DOCUMENTS 3,671,846  6/1972  Corey .................. 363/72 X

OTHER PUBLICATIONS

F. C. Schwarz and J. B. Klaassens, "A Reversible Smooth Current Source with Momentary Internal Resonse for Nondissipative Control of Multikilowatt DC Machines", IEEE Summer Meeting, Minneapolis, Minn., Jul. 13–18, 1980.
F. C. Schwarz and J. B. Klaassens, "A Controllable 45kW Current Source for DC Machines", IEEE Transactions on Industry Applications, vol. 1A-15, No. 4, Jul./Aug. 1979.
F. C. Schwarz, "A Double-Sided Cycloconverter", Proceedings of the 10th IEEE Power Electronics Specialists Conference, San Diego, Jun. 1979.
F. C. Schwarz and Moize de Chateleux, W.L.F.H.A., "A Multikilowatt Polyphase AC/DC Converter with Reversible Power Flow and Without Passive Low Frequency Filters", The 10th IEEE Power Electronics Specialists Conference, San Diego, Jun. 1979.
F. C. Schwarz, "A Method of Resonant Current Pulse Modulation for Power Converters", IEEE Transactions on Industrial Electronics and Control Instrumentation, vol. 17, No. 3, May, 1970.
F. C. Schwarz, "An Improved Method of Resonant Curent Pulse Modulation for Power Converters", IEEE Transactions on Industrial Electronics and Control Instrumentation, IECI-23, No. 2, 1976.
F. C. Schwarz and J. B. Klaasens, "A Controllable Secondary Multikilowatt DC Current Source with Constant Maximum Power Factor in its Three-Phase Supply Line", IEEE Transactions on Industrial Electronics and Control Instrumentation, vol. 23, No. 2, 1976.

Primary Examiner—Peter S. Wong
Assistant Examiner—Emanuel Todd Voeltz
Attorney, Agent, or Firm—Harold H. Dutton, Jr.

[57] ABSTRACT

A device for regulating the exchange of energy between at least two generating and/or receiving, DC and/or AC electrical systems, ($S_0 \ldots S_n$) for controlling the powers delivered or absorbed by said systems, these electrical systems being Y-connected to an oscillating circuit (OSC) by means of static switches ($C_p$, $Ca_1 \ldots C_n$), a controllable phase-shifting circuit (D) for driving the converters for producing at their outputs electrical values with a common frequency and with constrained phases; the oscillating circuits (OSC) oscillating at the above stated frequency for assuring temporary energy storage, and control means (MC) for feeding control signals as a function of the desired energy exchanges to the phase shifting circuits (D).

24 Claims, 30 Drawing Figures

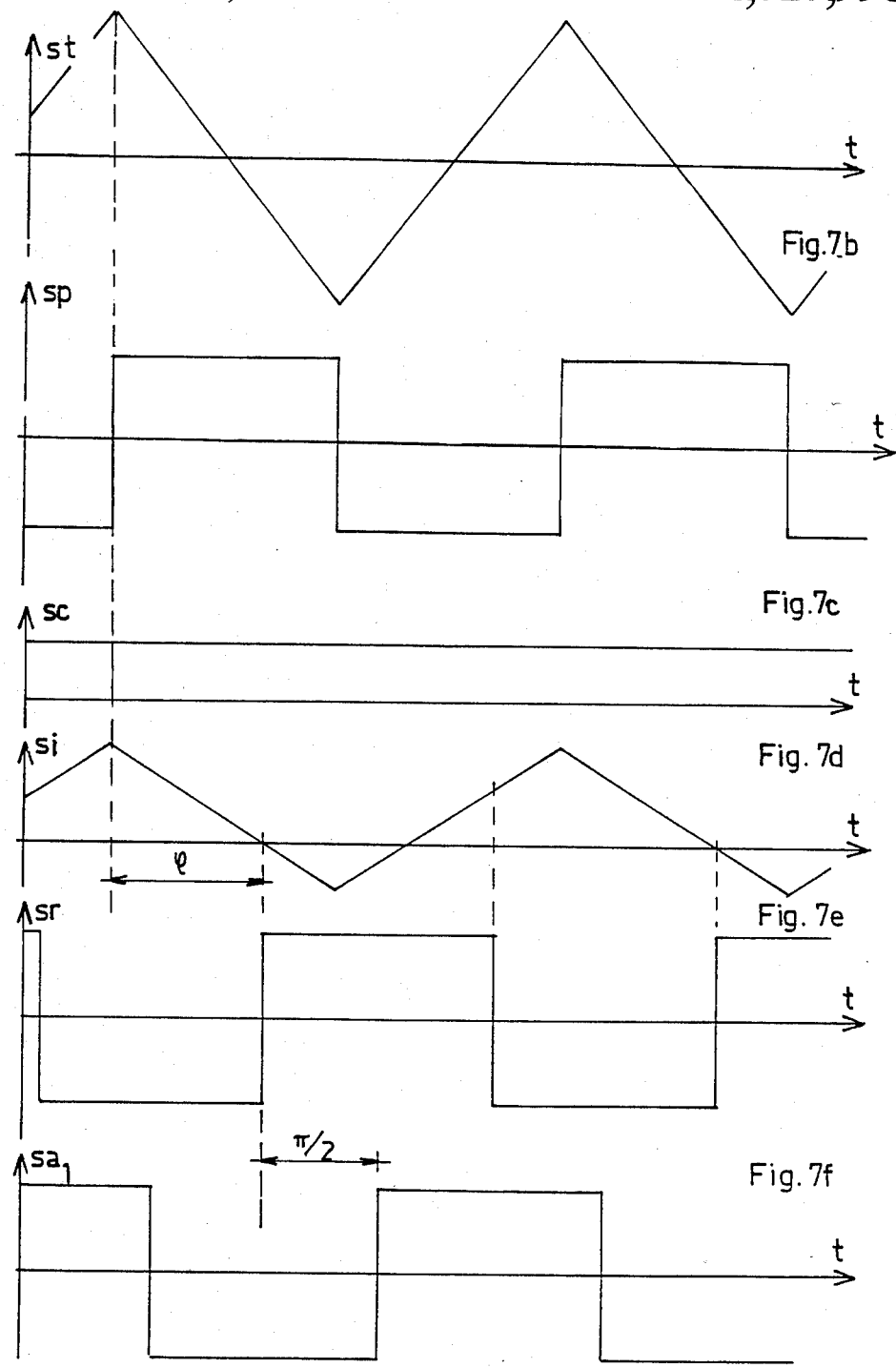

$f > f_r$    Fig. 16
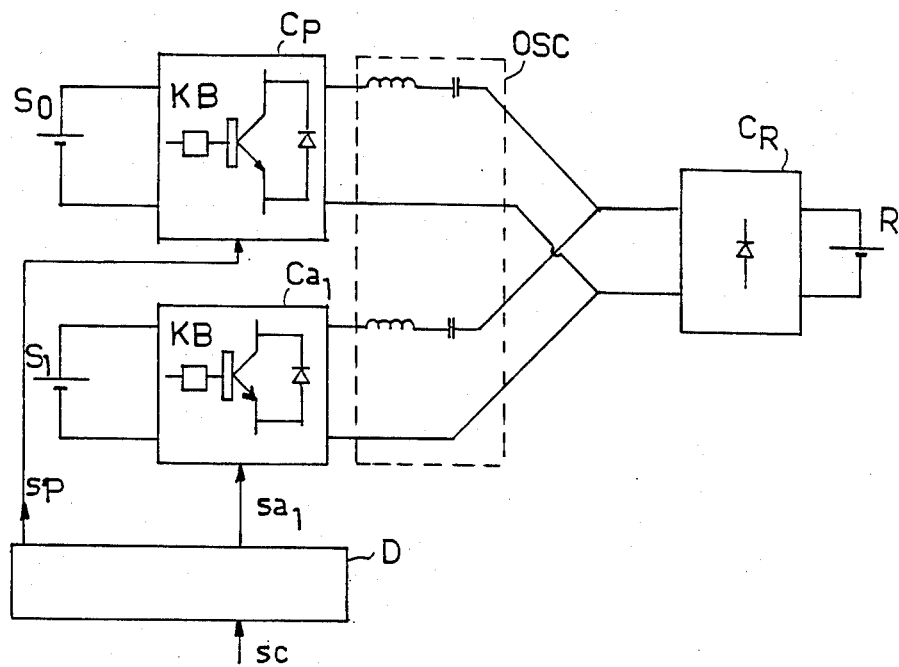
Fig. 17    $f < f_r$
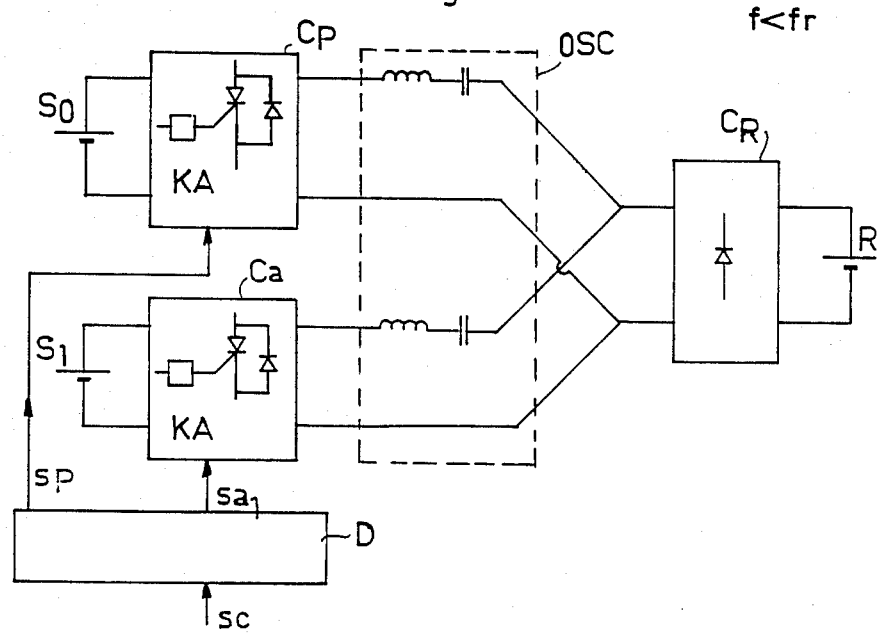

STATIC DEVICE FOR CONTROL OF ENERGY-EXCHANGE BETWEEN ELECTRICAL GENERATING AND/OR RECEIVING SYSTEMS

This invention was made at the Laboratoire d'Electrotechnique et d'Electronique Industrielle at the Institut National Polytechnique of Toulouse, which is No. 847 associate of the CNRS, and relates to a static regulator for energy exchange between at least two electrical generating and/or receiving systems for controlling the powers delivered or absorbed by the systems in accordance with particular specifications. In particular the invention relates to devices for controlling energy exchanges between a direct current source which may be associated with receiving loads (i.e. power sources operating uniquely as loads, passive loads...).

BACKGROUND AND OBJECTS OF THE INVENTION

1. Prior Developments

In many applications involving circuits with several generating and/or receiving systems of an electrical nature, the form of the energy being generated or absorbed must be adapted by each system in terms of predetermined imperatives intrinsic to the systems concerned. Illustratively a set of batteries integrated into an emergency unit when acting as a load must be charged according to a specific rating, and in case of power main failure must operate as a generator and deliver power adapted to the needs and compatible with the characteristics of the battery.

The most widespread solution for controlling energy exchanges between several systems comprises inserting energy converters between the pair of systems exchanging the energy and controlling each converter in relation to the energy exchange which is desired between two systems involved by conventional power control methods (pulse-width modulation, rectification phase control and the like). Each converter inserted between two particular electrical systems is selected to have at its input the features of one system (frequency, voltage...) and at its output the features of the other.

In almost all cases, the systems being considered are DC or low-frequency (industrial frequencies: 50 Hz or 400 Hz in aeronautics), and often it is necessary to introduce voltage isolation and to match the impedances between the systems. In the low-frequency case, the required transformers, filters etc. are heavy, bulky and costly; in the case of DC, additional AC stages must be provided, which either are low-frequency and incur the cited drawbacks, or preferably high-frequency stages are used. This latter type of stages (high-frequency) sometimes are used in low-frequency applications to eliminate the above cited drawbacks, and this is presently also the trend.

However under those conditions the conventional solutions for controlling converters are applicable only with difficulty because of their technical limitations and it becomes necessary to resort to other methods. In the case of an exchange between two systems, one of these methods comprises adjusting the power between the two systems by inserting between them an oscillation circuit and by varying the oscillating circuit and by varying the oscillation frequency of that circuit. Illustratively the object of the solution below is to control the exchanges between two DC or lowfrequency AC sources and is described in many publications, in particular in the following:

(1) F. C. Schwarz, "A Method Of Resonant Current Pulse Modulation For Power Converters"; *IEEE Transactions on Industrial Electronics and Control Instrumentation*, Vol. 17, No. 3, May 1970;

(2) F. C. Schwarz, "An Improved Method of Resonant Current Pulse Modulation For Power Converters", *IEEE Transactions on Industrial Elecronics and Control Instrumentation*, IECI-23, No. 2, 1976

(3) F. C. Schwarz and J. B. Klaassens, "A Controllable Secondary Multikilowatt DC Current Source With Constant Maximum Power Factor In Its Three-phase Supply Line"; *IEEE Transactions on Industrial Electronics and Control Instrumentation*, Vol. 23, No. 2, 1976;

(4) F. C. Schwarz and J. B. Klassens, "A Controllable 45 KW Current Source For DC Machines"; *IEEE Transactions on Industry Applications*, Vol. 1A-15, No. 4, July/August 1979;

(5) F. C. Schwarz, "A Double-sided Cycloconverter"; *Proceedings of the* 10th IEEE Power Electronics Specialists Conference, San Diego, June 1979;

(6) F. C. Schwarz and Moize de Chateleux, W.L.F.H.A., "A Multikilowatt Polyphase AC/DC Converter With Reversible Power Flow and Without Passive Low Frequency Filters"; The 10th IEEE Power Electronics Specialists Conference, San Diego, June 1979;

(7) F. C. Schwarz and J. B. Klaassens, "A Reversible Smooth Current Source With Momentary Internal Response For Nondissipative Control of Multikilowatt DC Machines"; IEEE Summer Meeting, Minneapolis, Minnesota, July 13–18, 1980.

This solution comprises assigning to each low frequency or DC source one converter and to interconnect the two converters by a series LC oscillation circuit. One of the converters applies a variable frequency and the power exchanged between the two sources is adjusted by varying this frequency; the other converter control solely determines the direction of the exchange of energy.

The main drawback of this type of device is in its very principle of operation: the frequency variation allowing to control the power must be possible over a large range in order that there may be practically significant regulation At the frequencies involved, such variations may make filtering difficult due to the width of the spectrum and therefore may become sources of environmental pollution (danger of interfering with other electrical equipment, even if remote, electromagnetic interference), on one hand; on the other hand, some power regulation—especially near zero power—sometimes is difficult to implement with such devices (because requiring very high or very low frequencies in relation to the average operational frequency).

Furthermore, this principle of control by varying the frequency is applied to an exchange between two electrical systems, and appears difficult to transpose to an exchange between a larger number of electrical systems. 2. Objects The primary object of the present invention is to create a new device for controlling energy exchanges which benefits from the advantages of high frequencies while being free fron the above described drawbacks.

One particular object is to permit operating at a constant high frequency in order to achieve a sharply defined spectrum and accordingly to make filtering much easier.

Another object of the invention is related to this constant, high-frequency operation and is to achieve very short response times independent of the power regulation.

A further object of the invention is to achieve very wide ranges of power variation wthout any particular difficulty near zero power.

Still another object of the invention is to considerably reduce the weight, the bulk and the cost of the accessory passive components required for each application, such as filters, isolation transformers or impedance-matching transformers.

Still a further object of the invention is to improve the converter efficiency by operating the converter, regardless of type, in much more advantageous modes than in the prior instances of frequency variation.

Yet another object of the invention is to create a device with very wide applicability which, in particular, is capable of controlling energy exchanges between an arbitrary number, equal to or exceeding 2, of systems.

DESCRIPTION OF THE INVENTION

The device of the present invention for controlling energy exchanges beween at least two electrical generating and/or receiving sustems for controlling the powers generated or absorbed by the systems according to specific requirements and comprises in combination:

(a) in association with each electrical system, at least one static electrical power converter connected to the system and with a drive or control input for receiving a drive or control signal, each of these converters being capable of converting the electric values of the various systems into electrical frequency and phase values depending on the drive signals, (b) a controlled phase shifting circuit connected to the drive inputs of the static converters and designed to generate drive signals resulting at outputs of the converters in electrical values with a common frequency and with relative phases as functions of the drive signals received by the phase-shifting circuit, (c) an oscillation circuit connected to the various converters and capable of temporary energy storage and of oscillating at the above stated common frequency.

(d) control means for the phase shifing circuit designed to feed to that circuit control signals determined by the energy exchanges of the predetermined specifications.

Accordingly, the device of the invention includes a constant-frequency oscillation circuit assuming the role of a temporary energy storage ("temporary storage" is intended to mean storing for a time at most equal to the period of the oscillation circuit and characterized by the energy over the period). The energy exchange between each converter and this circuit (and consequently the production or absorption of energy by the corresponding electrical system) can be adjusted even near null by suitably controlling the relative phases of the output values of said converter (voltage, current): zero power is obtained for a $\frac{1}{2}\pi$ phase-shift (quadrature), while extreme produced or absorbed values are obtained when the phase-shift is $\pi$ (phase opposition) or zero. As will be better understood below, these controls are implemented by acting on the related phases of the converters, and in particular may be carried out by taking out one of the converters, called the master converter, as the phase reference and regulating the phases of the other converters, called slave converters, with respect thereto.

As a result, a system is obtained which operates at a constant frequency that can be set at the most suitable value and which is adequate to reduce the size of the passive components (transformers, filters...), but which is also compatible with the technical limitations of the static switches in the converters at the power level being considered. In practice, the phase-shifting circuit setting this operational frequency is provided with a reference unit which can impose an adjustable but constant frequency exceeding the highest of the electrical systems, for instance 2 kHz for DC systems or for 50, 60, or 400 Hz AC systems. Such constant-frequency operation allows easy filtering, in particular power filtering, radio-frequency filtering or the like due to the sharp spectrum definition.

In addition to making possible the above mentioned exchange between the electrical sytems, the device of the invention also permits, where called for, transfering energy to one or more loads. A static, uncontrolled converter then is inserted between each of these loads and the oscillation circuit. The loads(s) may be determined by the application, which requires controlling the energy fed to them, or, on the contrary, may be present within the scope of the invention to assure the balance of energy exchange between the oscillating circuit and the various electric systems in the event of imbalanced exchanges between these electric systems. In the latter case, the provided load is designed to absorb the excess energy.

The device of the invention is widely applicable regardless of the number of electrical systems to be controlled and of any number loads. In particular it covers such very common present applications as:

(a) regulating the energy exchanges between two reversible DC current sources, there being two converters comprising voltage inverters;

(b) regulating energy exchanges between two reversible current DC sources and a DC load, for instance a DC source acting as a constant load, the two controlled converters associated with the current-reversible sources being voltage inverters, and the uncontrolled converter being a diode rectifier;

(c) regulating energy exchanges between a current-reversible DC voltage source and a bipolar device reversible in voltage and/or current in order to obtain a power generator in which the waveforms are programmable or a fourquadrant supply from a DC current machine;

(d) regulating energy exchanges between a current reversible DC voltage source and a single-phase or multi-phase system.

DESCRIPTION OF THE DRAWINGS

The invention will be more clearly understood from the description below and the attached drawings showing on one hand an overall diagram and additional diagrams illustrating its operation, and on the other hand several embodiment modes with associated diagrams.

FIGS. 7a, 7b, 7c, 7d, 7e, 7f, are time-plots showing the operation of the control stage of the first embodiment;

FIGS. 16 and 17 are electrical schematic views of a second embodiment and of a variation thereof;

DESCRIPTION OF PREFERRED EMBODIMENTS

Figure 1:
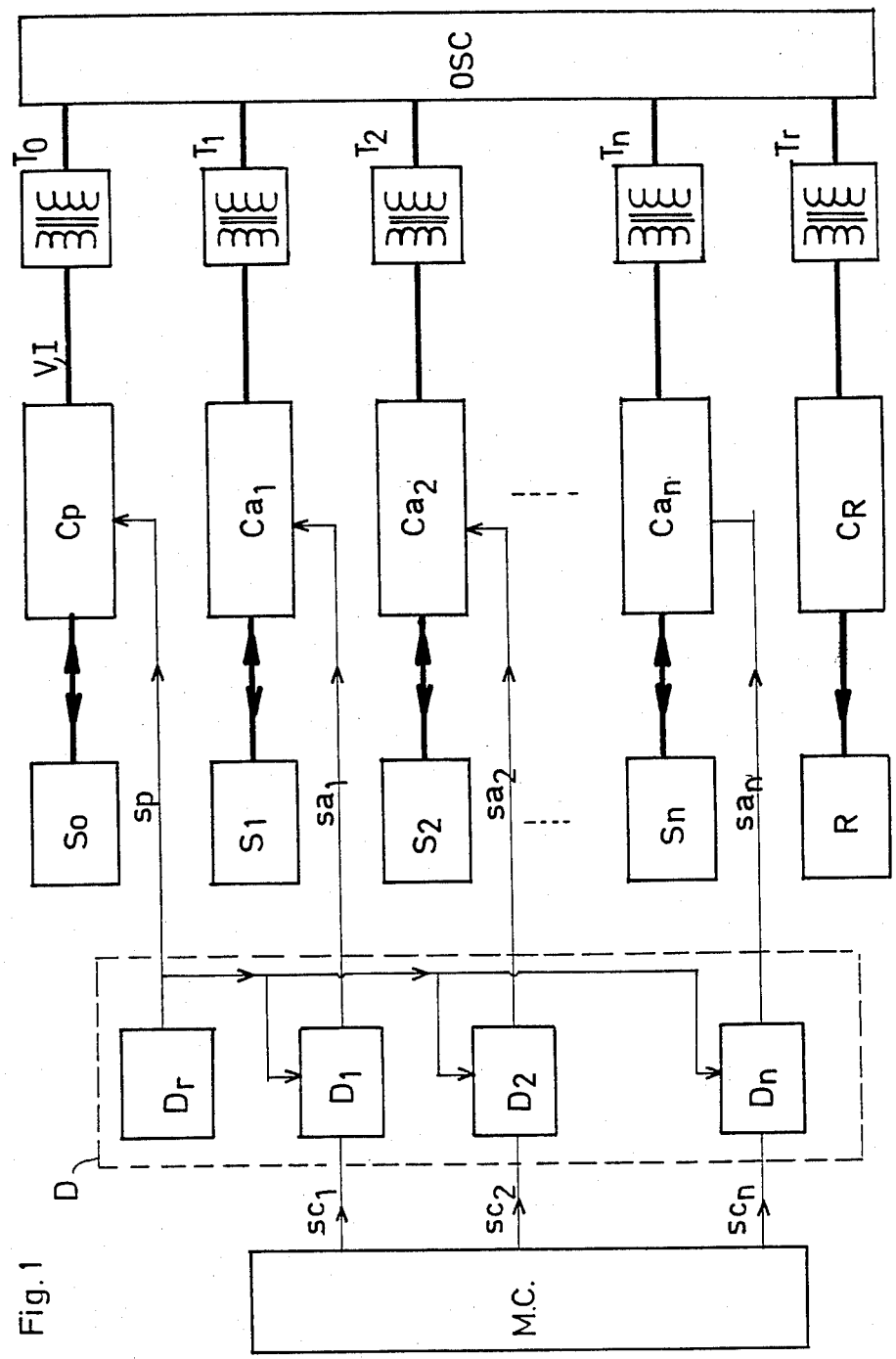
FIG. 1 is a block diagram (shown in solid lines) of a device of the invention in its overall form.

The apparatus shown in FIG. 1 is intended to control energy exchanges between n+1 electrical generating and/or receiving systems $S_0$, $S_1 \ldots S_n$ and a load R. The average power exchanged between these systems and the load is assumed to be balanced. This balance may arise from the specifications themselves (the control possibly applying between the n+2 components which are determined by the application) or it may be obtained by emplacing the load R (the control taking place between the n+1 electric systems).

For example, $S_0$ may be the national electric three-phase network (380 volts, 50 Hz), $S_1$ may be a set of storage batteries, $S_2$ may be a reversible electric motor with regenerative braking (hoisting motor) and R may be an added ohmic or resistive load included to absorb any excess power. This system corresponds to an uninterrupted supply for an elevator, for example, and its purpose is to control the exchanges in order to provide operational reliability while optimizing power use in the $S_0$ circuit.

The apparatus comprises n+1 controllable static converters $C_p$, $Ca_1$, $Ca_2 \ldots Ca_n$ each comprising semiconducting static switches, at least one of which is controllable. The static switches of each converter may include conventional circuits to assist in switching and the to improve the switching conditions for the switches. Each controllable static switch is provided with a blocking and/or triggering circuit capable of actuating the switch as a function of a control signal received by the converter. These converters may be of several well known types such as rectifiers, voltage inverters or the like.

Each controllable converter $C_p$, $Ca_1 \ldots Ca_n$ is associated with one of the electrical systems $S_0$, $S_1 \ldots S_n$, and can convert DC or low frequency energy into a higher frequency energy. In practice and due to technical constraints, this higher frequency, which exceeds the highest of the electrical systems, will depend on the power to be exchanged. For example, it will be about several kHz for powers of about several hundred kilowatts, several tens of kHz for powers of several tens of kw and possibly even higher for lower powers.

Furthermore the load R is associated with an uncontrolled converter $C_R$ which as a rule is a diode rectifier and is capable of fuctioning at the above stated higher frequency.

The various converters $C_p$, $Ca_1$, $Ca_2 \ldots Ca_n$, $C_R$ are connected to an oscillating circuit OSC, in this example through transformers $T_0$, $T_1$, $T_2 \ldots T_N$, $T_R$ which provide impedance matches voltage isolation. These transformers benefit from a reduction in size and weight related to their operation at the higher frequency. In some cases transformers with redundant functions may be eliminated. Each transformer may be compound, and in particular may comprise one, or several, primary and/or secondary windings, either coupled or not.

In its simplest form, the oscillation circuit OSC comprises a network of coupled inductors and capacitors, and can oscillate at the above mentioned higher frequency, and ensure temporary energy storage within the scope of its period of oscillation.

The converters $C_p$, $Ca_1 \ldots Ca_n$ are controlled from a controllable phase shift circuit D feeding to each, drive signals sp, $sa_1 \ldots sa_n$ whereby the outputs of the converters are electrical values (V,I) with a common frequency equal to the above mentioned higher value, and of which the relative phases depend on the control signals received by the phase-shifting circuit.

This phase-shifting circuit D is controlled by control means MC designed to feed to the circuit, control signals $sc_1$, $sc_2$, $\ldots sc_n$ which depend on the specific energy exchanges.

Preferably, the phase-shifting circuit D may include:

a reference unit $D_r$ connected to the drive input of one of the converters, termed the master converter $C_p$, in order to provide a phase reference and constrain the above stated high frequency, or a phase-regulating unit comprising in particular n phase-shifters $D_1$, $D_2 \ldots D_n$ each associated with a slave converter $Ca_1$, $Ca_2 \ldots Ca_n$ and connected to its drive input for applying to the outputs of the slave converters $Ca_1 \ldots Ca_n$, phase-shifts related to the master converter $C_p$ as functions of the control signals $sc_1$, $sc_2 \ldots sc_n$.

The reference unit $D_r$ may comprise an adjustable frequency oscillator allowing to set the common operation frequency of the converters and of the oscillating circuit at the desired high value.

To illustrate the operation of the device, FIGS. 2a, 3a, 4a, and 5a show the output values (voltage V, current I) of an arbitrary controllable converter, by making the most commonplace assumption that the corresponding electrical systems are DC voltage sources with a frequency low compared to the high frequency forced on the oscillating circuit.

The output voltage V of the converter under consideration is a rectangular (e.g. square) signal (if connected to a DC electric system) or it is an amplitude-modulated lowfrequency signal (if connected to a low-frequency electric system). The output current I of the converter is at the above stated higher frequency and in the example shown is sinusoidal for an oscillating circuit comprising inductors and capacitors.

FIGS. 2b, 3b, 4band 5b show the instantaneous power P (VI) and the average power $P_{aver}$ exchanged by the converter under consideration.

Figure 2A:
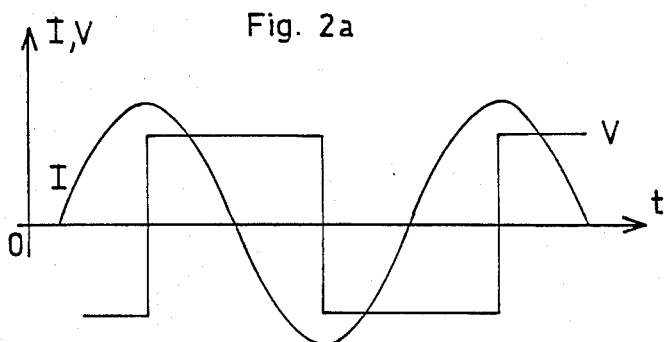
FIGS. 2a, 2b, 3a, 3b, 4a, 4b, 5a and 5b are time plots showing the operation of the device.
Figure 2B:
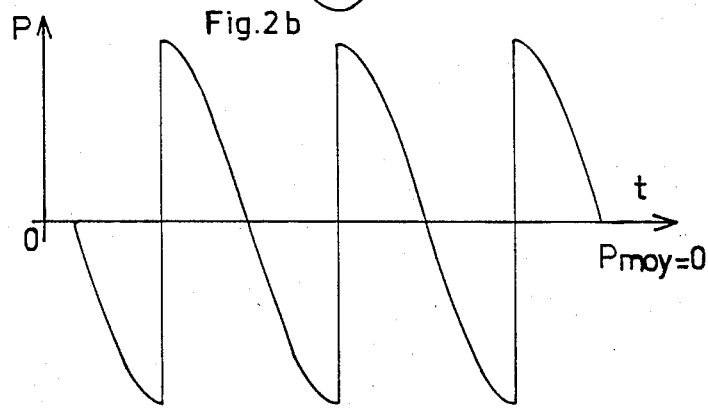

In FIG. 2a is shown the case of a converter in which the output values are in phase quadrature. The average power exchanged between the converter considered and the oscillating circuit (and hence the power exchanged by the corresponding electrical systems) then is zero as shown in FIG. 2b.

Figure 3A:
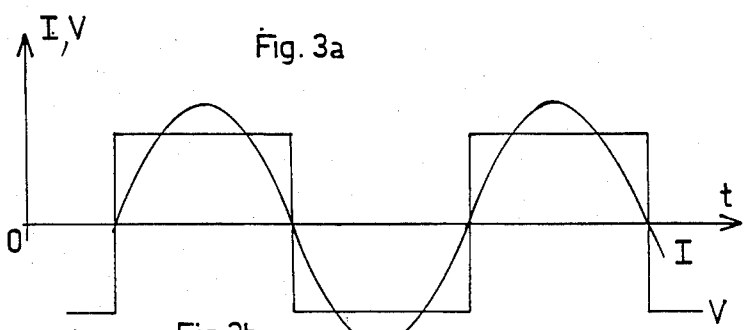
Figure 3B:
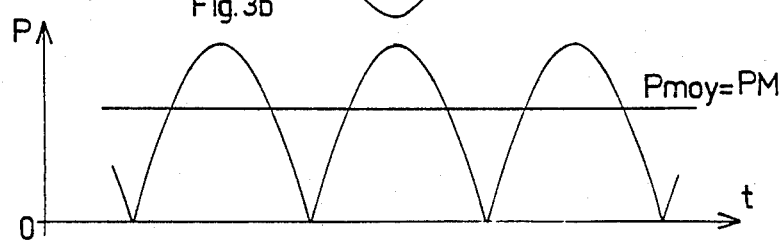

FIG. 3a shows the case of a converter where the output values are in phase. The corresponding electrical system then delivers a maximum average power $P_M$ as shown by FIG. 3b.

Figure 4A:
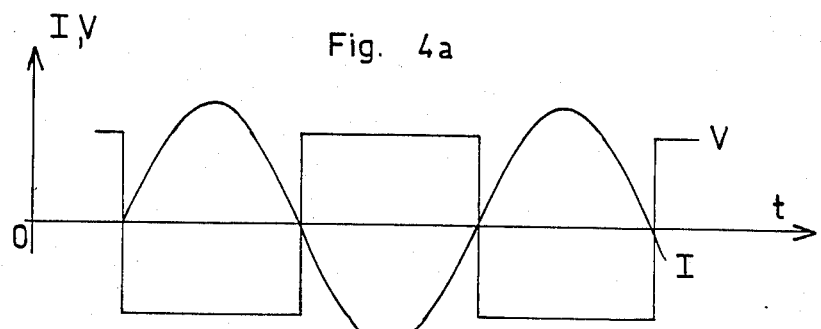
Figure 4B:
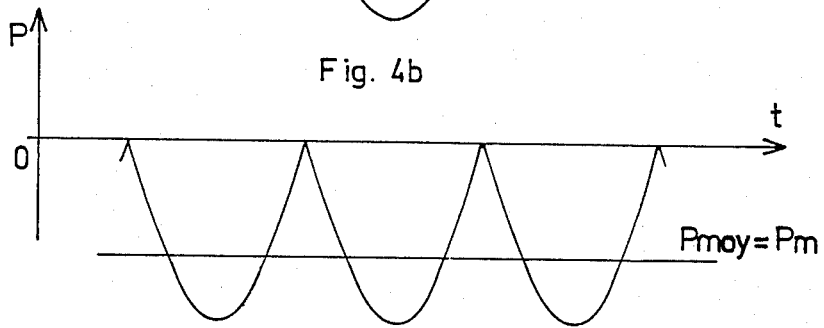

FIG. 4a shows the case of a converter in which the output values are opposite in phase. The oscillating circuit then delivers to the electrical system a maximum average power $|P_m|$ as shown by FIG. 4b.

Figure 5A:
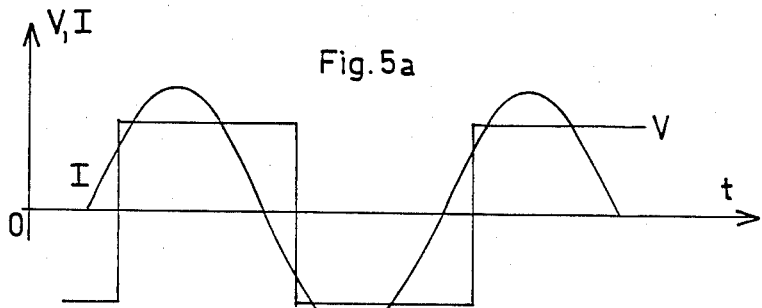
Figure 5B:
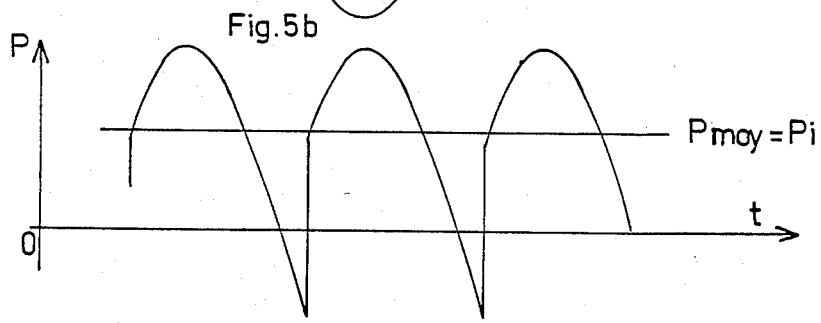

FIG. 5a shows an intermediate case in which the electrical system delivers an intermediary average power $P_i$ to the oscillator network as shown in FIG. 5b.

The phase shift between the voltage V and the current I at the output of each slave converter $Ca_1$ is achieved by adjusting the phase shift relative to the voltage of the slave converter with respect to the master converter $C_p$ by means of the drive signal $sa_i$ fed by the corresponding phase-shifter $D_i$ to the converter.

At any instant, the control signals $sc_1$, $sc_2$, ... $sc_n$ from the control means MC thereby allow adjusting the average power exchanged by each system within the range ($P_m$, O, $P_M$) defined above. These control signals may be preprogrammed to obtain desired exchange cycles. In many applications, the control means MC are connected to sensors in order to make the exchanges subject to external paramenters or events.

In the description which follows, the same references as in FIG. 1 are used in the corresponding blocks.

Figure 6:
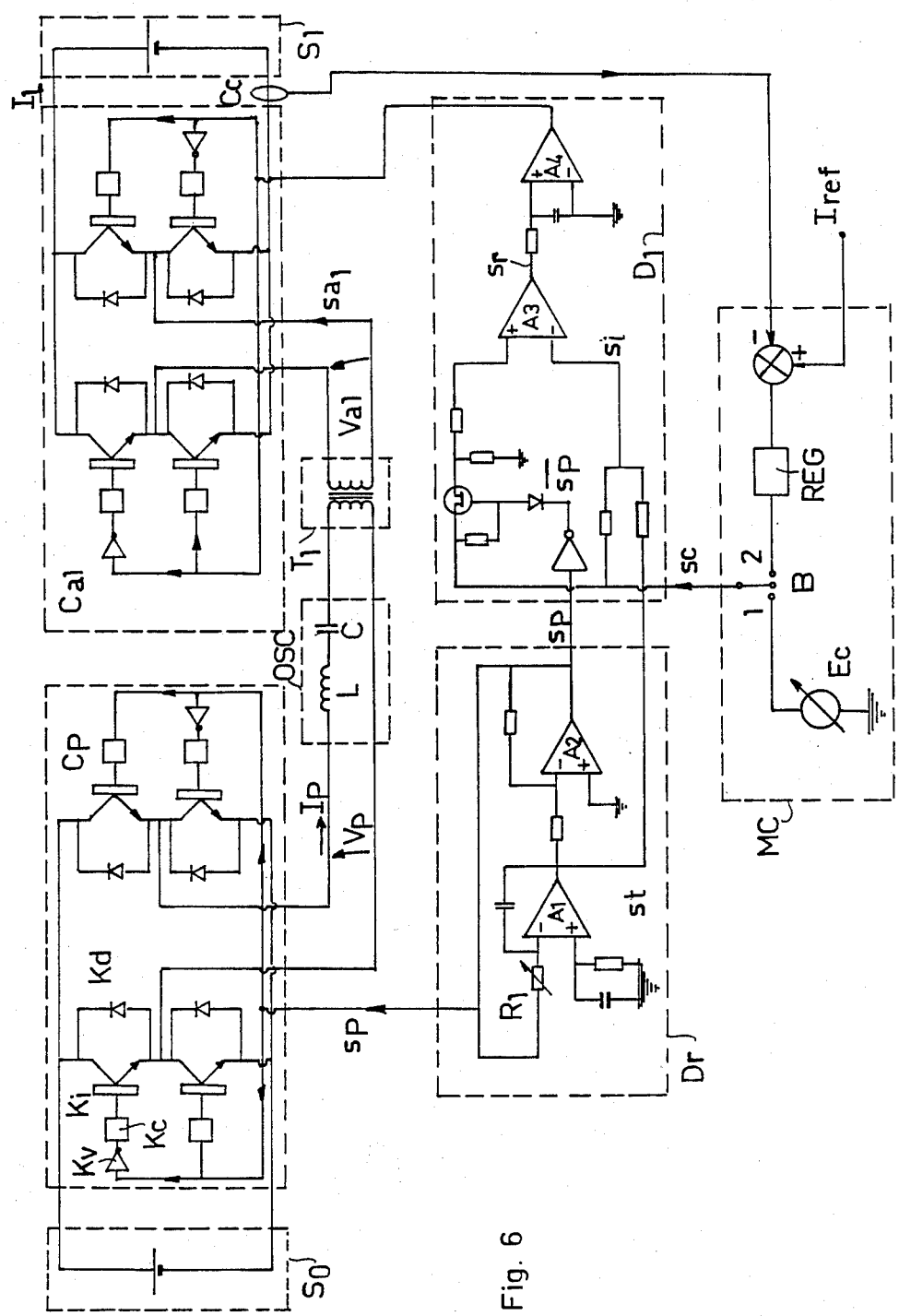
FIG. 6 is a circuit diagram of a one embodiment.

FIG. 6 shows a device of the above described type for controlling energy exchanges between two electric systems comprising DC voltage sources $S_o$ and $S_1$ which are current-reversible.

The source $S_o$ is associated with a master converter $C_p$ and the source $S_1$ with a slave converter $Ca_1$. These converters are voltage inverters with the same number of phases.

The master inverter $C_p$ is driven by an oscillator $D_r$ with an adjustable frequency, while the slave converter $Ca_1$ is driven by a phase-shifter $D_1$ which is referenced on the oscillator $D_r$ in order to impose on this slave converter a frequency f identical with that of the master inverter and a specific phase-shift.

The two inverters $C_p$ and $Ca_1$ are interconnected by an oscillation circuit OSC comprising a series LC curcuit with a resonant frequency of about the same magnitude as the frequency f of the inverters, and a transformer $T_1$ providing voltage isolation between the two sources.

A control voltage generator MC is connected to the phase shifter $D_1$ to feed to it a control voltage sc depending on the desired power exchanges between the two sources $S_o$ and $S_1$.

In the particular application under consideration, each inverter $C_p$ or $Ca_1$ is single phase and is provided with at least one pair of controllable, semiconductor switches. In the example of FIG. 6, each of the inverters $C_p$ and $Ca_1$ comprises four identical static switches such as $K_i$ which are mounted in a bridge. Each switch $K_i$ is mounted in antiparallel with a diode $K_d$ and is a synthesizing switch capable of spontaneous triggering when at a voltage near zero and allowing controlled blocking. In particular each switch may comprise a power transistor with an appropriate drive interface $K_c$ (this interface may be of the type described in French patent application No. 84.07708. This interface $K_c$ receives the control signal sp or $sa_1$, either directly for the switches of one diagonal, or through an inverter $K_v$ for the switches of the other diagonal.

The characteristics of the OSC oscillating circuit are such of that its resonant frequency fr is less than the common frequency f of the oscillator $D_r$ and of the inverters $C_p$ and $Ca_1$. The selection of these relative values ensures the natural switching conditions of the switches $K_i$ provided with their drive interface $K_c$ (spontaneous triggering when voltage is near zero and controlled blocking).

The oscillator $D_r$ as shown is made from a conventional closed loop with operational amplifiers $A_1$, $A_2$. The frequency of this oscillator can be adjusted by varying a resistance $R_1$.

The phase shifter $D_1$ is a conventional phase shifter with operational amplifiers $A_3$, $A_4$ and is designed to deliver a drive signal $sa_1$ of which the phase shift with respect to the control signal sp is between $\pi/2$ and $3\pi/2$.

The control generator MC is fitted to each application and illustratively includes in the present examples on one hand, a variable control voltage generator EC which when connected through the switch B allows regulating the exchanges in open-loop according to a specific program, and on the other hand, a drive circuit with a sensor $C_c$ for the current through the source $S_1$ and which, when connected, allows controlling the power exchanges by driving the current $I_1$ of the source $S_1$ to a reference value $I_{ref}$.

FIGS. 7a, 7b, 7c, 7d, 7e and 7f, illustrate the shapes of the signals at various points in the control stage $D_r$, $D_1$, MC of the device of FIG. 6.

FIGS. 7a and 7b respectively show the signals st and sp at the amplifiers $A_1$ and $A_2$ of the oscillator $D_r$.

FIG. 7c illustrates the control signal sc at the output of the generator MC.

FIG. 7d illustrates an intermediary signal $s_i$ which is half the sum of the control signals sc and st.

FIG. 7e shows the signal $s_r$ at the output of the amplifier $A_3$. This signal results from the comparison of the intermediary signal $s_i$ with either the signal sc when sp is negative, or O when sp is positive.

In this manner a signal $s_r$ which is phase-shifted relative to sp by an angle $\rho$ between O and $\pi$ depending on the control signal sc is obtained.

The amplifier $A_4$ introduces an additonal constant phase shift of $\pi/2$.

The drive signal $sa_1$ from the phase shifter $D_1$ is shown in FIG. 7f.

It should be the drive signal sp exclusively carries frequency whereas the contol signal $sa_1$ carries both frequency data (the same as the previous one) and phase information relating to the preceding signal.

Figure 8A:
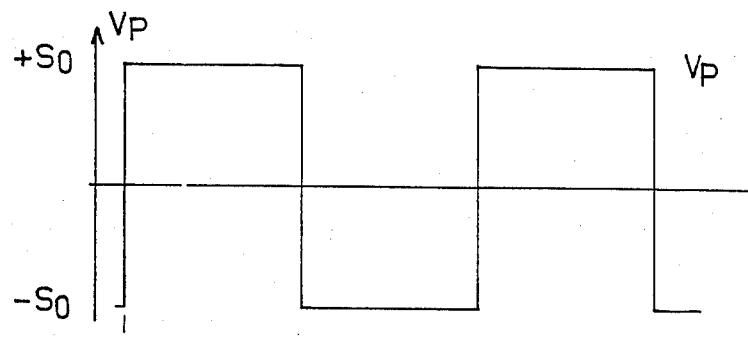
FIGS. 8a, 8b, and 8c are time-plots illustrating operation of the power stages.
Figure 8B:
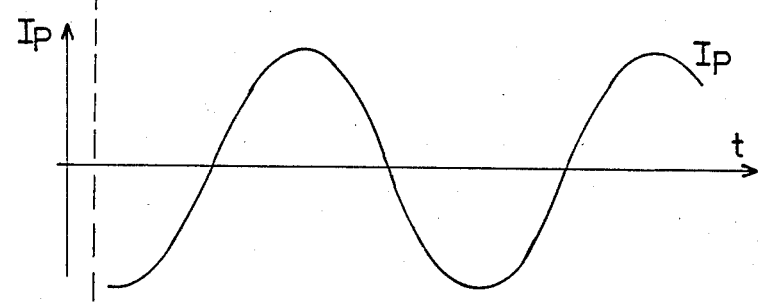
Figure 8C:
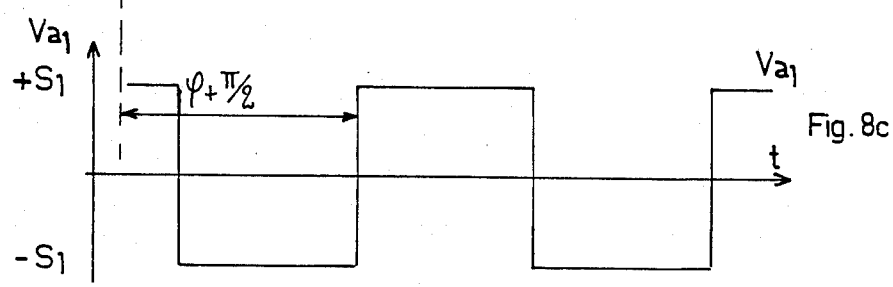

FIGS. 8a, 8b, 8c, illustrate the shapes of the signals $V_p$, $I_p$ and $Va_1$ which are respectively the output voltage of the inverter $C_p$, the current passing through the oscillating circuit OSC and the output voltage of the inverter $Ca_1$.

The voltages $V_p$ and $Va_1$ are square voltages with a frequency which is that of the oscillator $D_r$ and with an amplitude constrained by the source $S_0$ or $S_1$ (to simplify notations, the symbols $S_0$ or $S_1$ also denote the voltage across the terminals of the corresponding source).

The current $I_p$ is quasi-sinusoidal and phase shifted to lag behind $V_p$ and to lead $Va_1$, whereby the natural switching conditions of the static switches $K_i$ making up the inverters $C_p$ and $Ca_1$ are obtained.

The power exchange is conditional upon the phase shift between the voltages $V_p$ and $Va_1$ and if the frequency is constant, solely by that phase shift which is constrained by the control signals sp and $sa_1$ as a function of the command sc.

Figure 9:
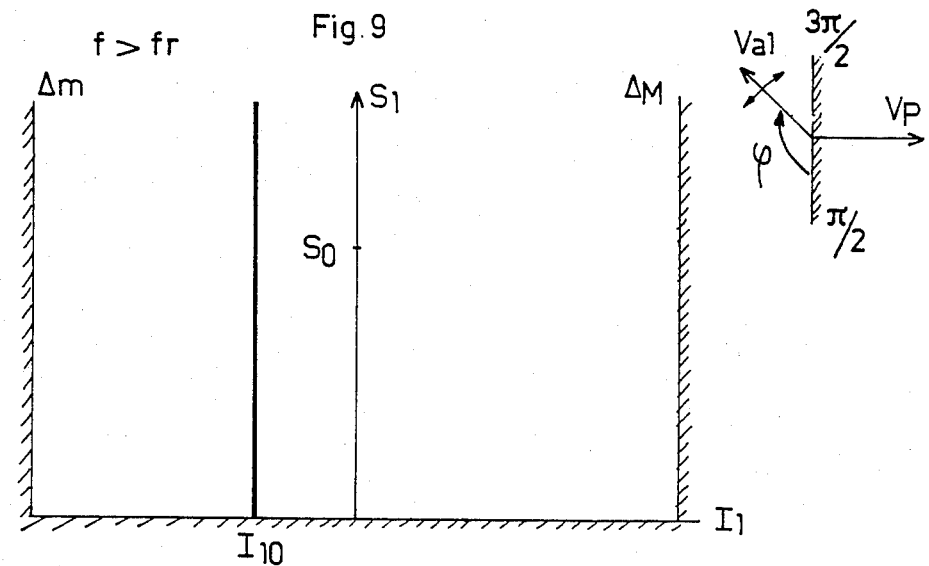
FIG. 9 is a schematic view showing possible exchanges for this embodiment.

FIG. 9 symbolically shows the possible power exchanges between the sources $S_0$ and $S_1$. The set of possible operational points ($S_1$, $I_1$) is defined by a half-plane $S_1 > O$ bounded by two straight lines $\Delta M$ and $\Delta m$ corresponding to the algebraic maximum and minimum currents in the source $S_1$. In this type of assembly operating at constant frequency, the current $I_1$ only depends on the phase-shift between the inverters (when the $S_0$ voltage is constant). For a given phase-shift, and when the voltage $S_1$ varies, the operational point $S_1$, $I_1$ moves along a straight line parallel to the ordinate axis with an abscissa $I_{10}$. FIG. 9 also shows a vector plot of the possible phase-shift in this assembly between the voltage $V_p$ and the $Va_1$. When this phase-shift varies between $\pi/2$ and $3\pi/2$, the power exchanged by the source $S_1$ varies continuously between two extreme, positive and negative values.

Figure 10:
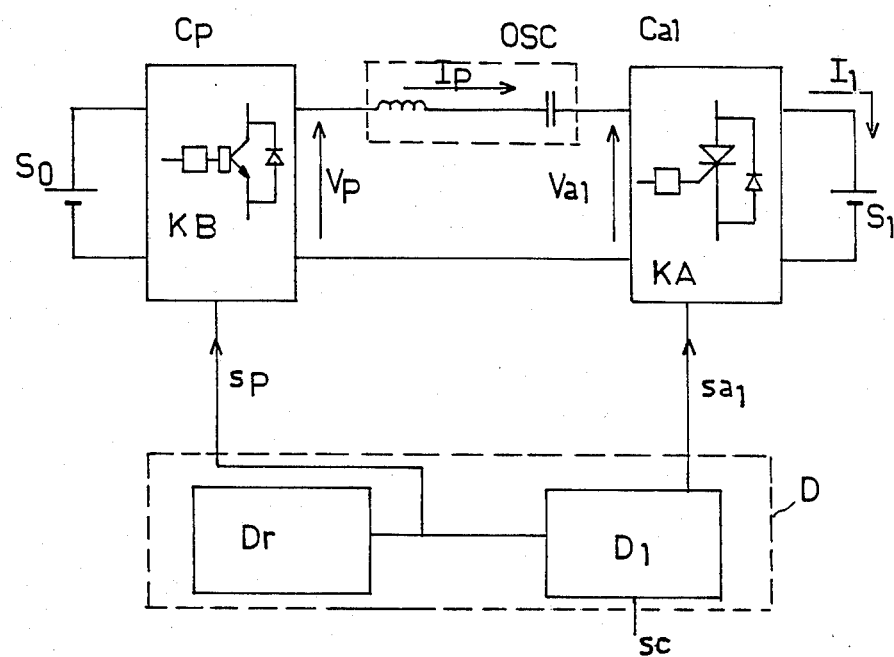
FIGS. 10, 12, and 14 are functional diagrams of variations of the first embodiment.

FIG. 10 shows a variation of the preceding device. In this variation, the energy exchange takes place between a source $S_0$ and a DC source $S_1$ with a voltage less than that of the DC source $S_0$.

The oscillating circuit OSC as before is at a resonance frequency fr less that the inverter frequency f.

The phase-shifter $D_1$ is designed to introduce a phase-shift between $-\pi/2$ and $+\pi/2$. This is achieved in a simple manner by providing a reversing switch at the output of the already described phase-shifter.

The master inverter $C_p$ is associated with the higher voltage source $S_0$ and comprises at least one pair of semiconducting controllable static switches, preferably four such switches mounted as a bridge as before. Again, each switch is mounted in antiparallel with a diode and is of such a type that it can provide spontaneous triggering for a voltage near zero and a controlled blocking.

The slave inverter $Ca_1$ is associated with the lower voltage source $S_1$ and has the same structure as described above, with the exception that the switches are different, and in this case are of a type capable of presenting a spontaneous blocking when the current is near zero and allowing controlled triggering (for instance a thyristor).

For giving a more synthetic representation of the inverters, they are shown by a block inside which there is the type of switch of which it is comprised. The switch is designated KA when it is controllable to triggering (thyristor type), and by KB when it is controllable to blocking (transistor type with suitable drive interface).

The signals obtained are similar to those shown in FIGS. 7a through 7f, and 8a through 8c.

Figure 11:
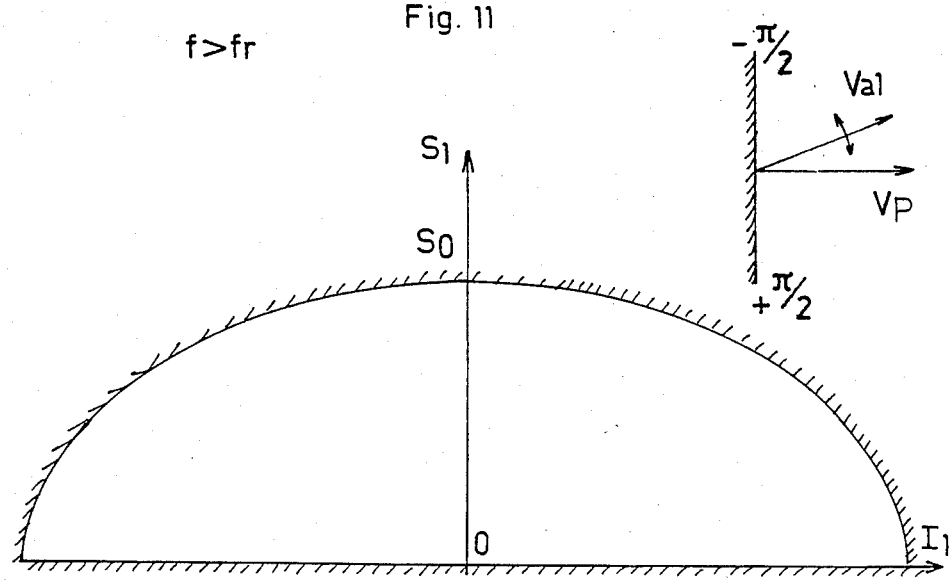
FIGS. 11, 13, and 15 are schematic views showing the exchanges possible in the variations of FIGS. 10, 12 and 14.

FIG. 11 schematically shows the set of operational points $S_1$, $I_1$ for this variation. They lie in the halfplane $S_1>0$ bounded by an ellipse representing the switching limits of the inverter $Ca_1$.

Figure 12:
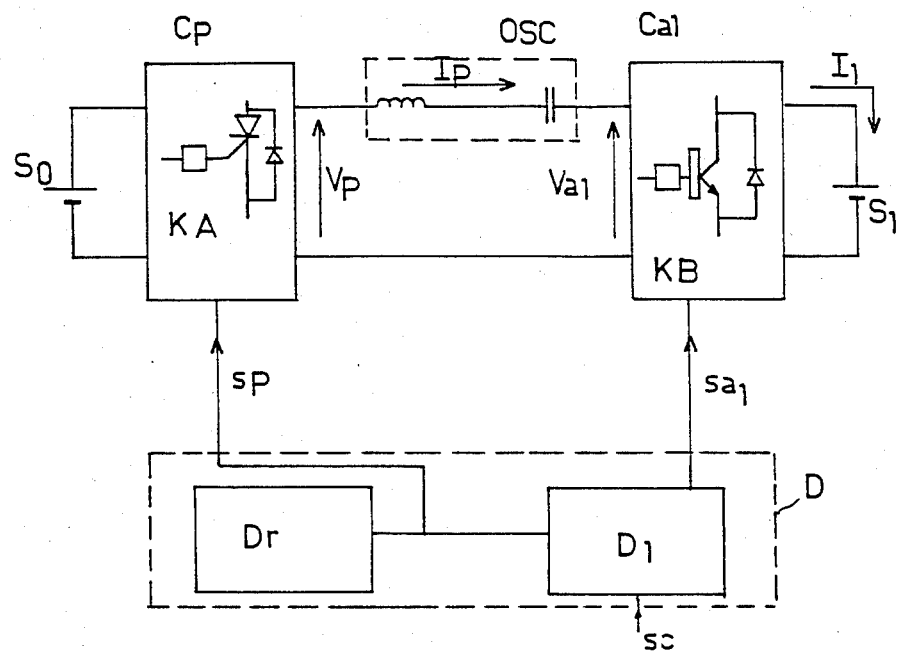

FIG. 12 shows another variation which permits regulation of the energy exchanges between a DC voltage source $S_0$ and a DC voltage source $S_1$ of a lesser voltage than the source $S_0$.

In this variation, the OSC circuit has a resonant frequency fr higher than the inverter frequency f.

The phase shifter $D_1$ is designed to introduce a phase shift beteen $-\pi/2$ and $+\pi/2$.

The master inverter $C_p$ is associated with the higher voltage source $S_0$ and comprises the static type KA switches discussed above.

The slave inverter $Ca_1$ is associated with the lower voltage source $S_1$ and comprises the type KB switches.

The phase-shifter $D_1$ is designed to introduce a phase-shift between $-\pi/2$ and $+\pi/2$.

Figure 13:
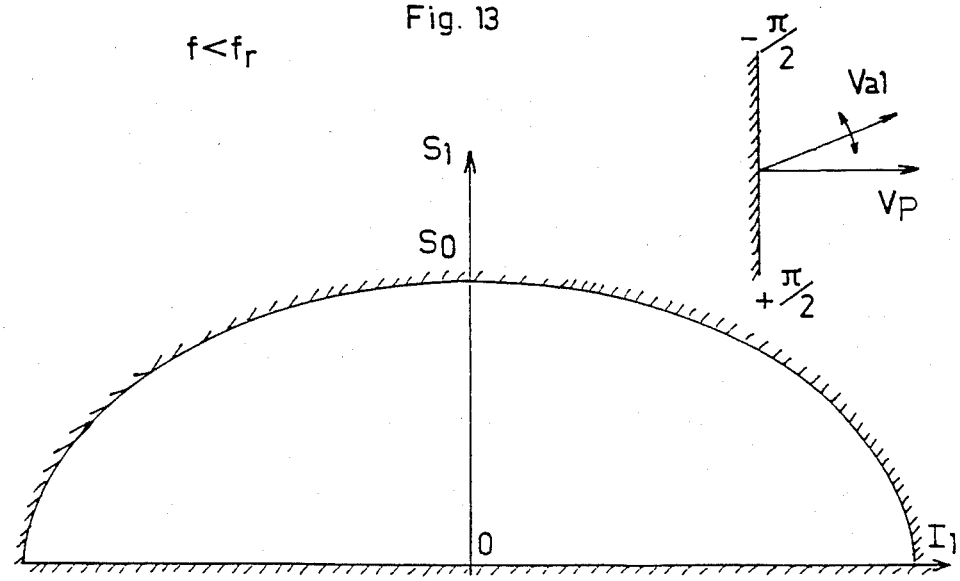

The schematic representation of the set of operational points (FIG. 13) is identical with the preceding one.

Figure 14:
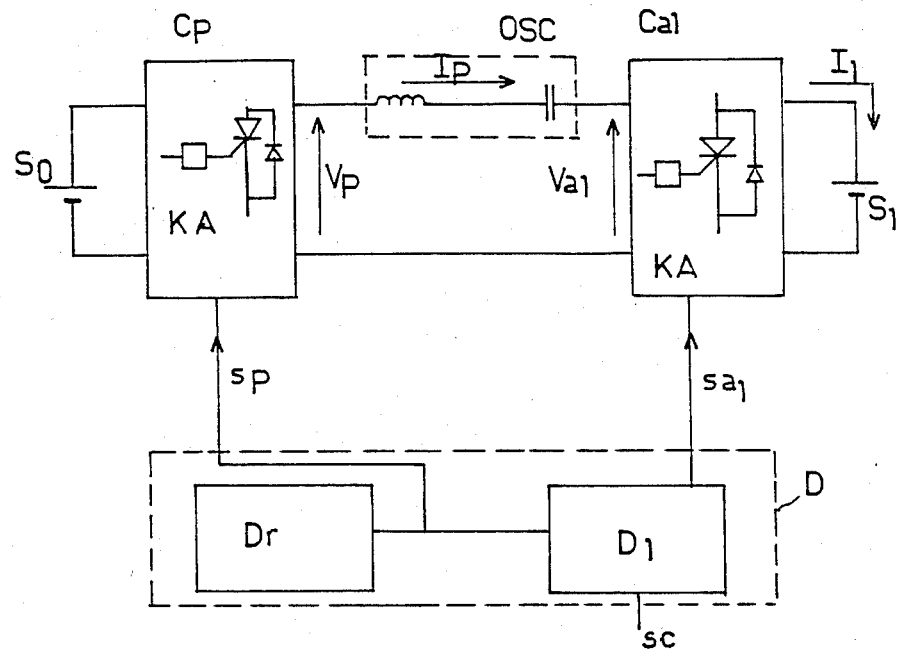

FIG. 14 is a schematic of another variation in which:

the oscillating circuit OSC has a resonant frequency fr higher than the frequency f of the inverters, the phase shifter $D_1$ can introduce a phase shift between $+\pi/2$ and $+3\pi/2$ between the output voltage of the master inverter $C_p$ and the output voltage of the slave inverter $Ca_1$, the master inverter $C_p$ and the slave inverter $Ca_1$ are identical and of the KA type.

Figure 15:
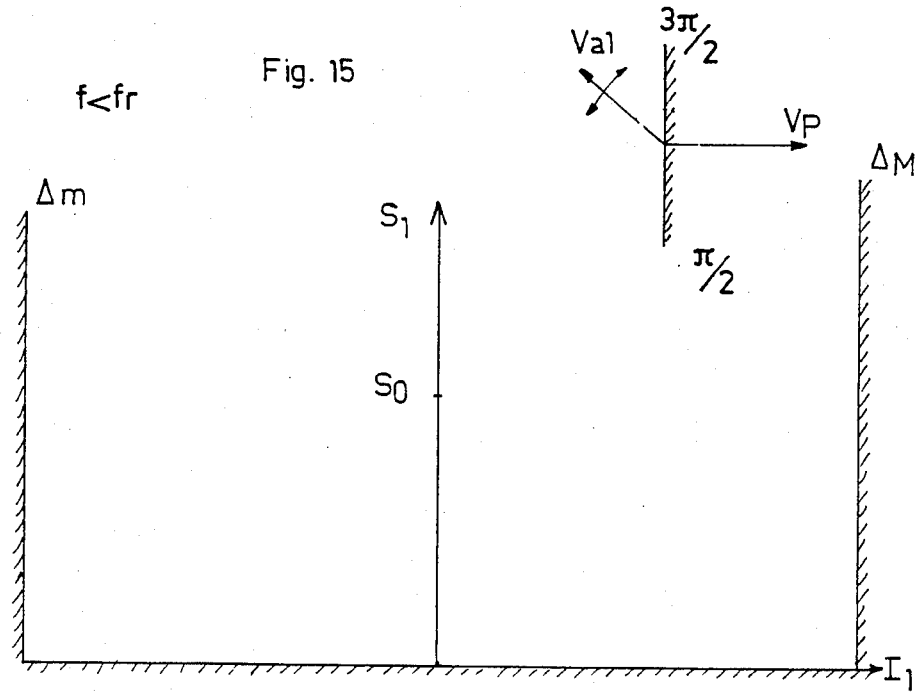

The schematic representation of the set of operational points (FIG. 15) is identical with that of FIG. 9.

FIGS. 16 and 17 respectively show another embodiment of the invention and a variation allowing regulation of energy exchanges between two DC voltage sources which are current-reversible, $S_0$ and $S_1$, and a DC receiving load R. These assemblies are characterized by:

two inverters $C_p$ and $Ca_1$ with the same number of phases (in this example, single phase), each associated with one of the voltage sources $S_0$, $S_1$;

an oscillator of the above described $D_r$ type feeding a periodic signal sp to the drive input of the inverter $C_p$ and a phase shifter $D_1$ of the above described type and capable of feeding a signal $sa_1$ similar to the previous signal sp and phase-shifter between 0 and $\pi$ with respect to it;

an oscillating circuit OSC comprising two series LC circuits each connected to one of the inverters $C_p$, $Ca_1$;

a voltage generator MC similar to the previous one;

a single phase diode rectifier $C_R$ associated with the receiving load R.

In the case of a multi-phase assembly, the rectifier $C_R$ has the same number of phases at the input as the inverters have, each rectifier phase being Y-connected with the oscillation circuits OSC connected to the homologous phases of the two inverters.

In the case of FIG. 16, each LC oscillating circuit of the OSC ccircuit has a frequency fr less than the inverter frequency f. These inverters, in that event, both comprise type KB switches.

In the case of FIG. 17, each LC oscillation circuit of the OSC circuit has a frequency fr higher than the inverter frequency f. In that event, the inverters both comprise type KA switches.

In both cases, the phase shifter $D_1$ allows continuous variation of the phase shift by 180° and consequently the power absorbed by the receiving load R can vary between zero and a maximum value.

The two sources $S_0$ and $S_1$ may be identical, in which case the LC oscillating circuits associated with the inverters are all identical.

Starting with the single phase assemblies that were shown in illustrative manner, the expert is able to implement assemblies using multi-phase inverters. In that event, the oscillator $D_r$ is designed to feed n periodic signals sp of the same frequency and phase-shifted by $2\pi/n$ (where n is the number of phases) to the master inverter, while the $D_1$ phase shifter is designed to feed n periodic signals $sa_1$ of the same frequency and each with the phase shift constrained by the control signal sc with respect to the signal sp of the homologous phase to the slave inverter.

Figure 18:
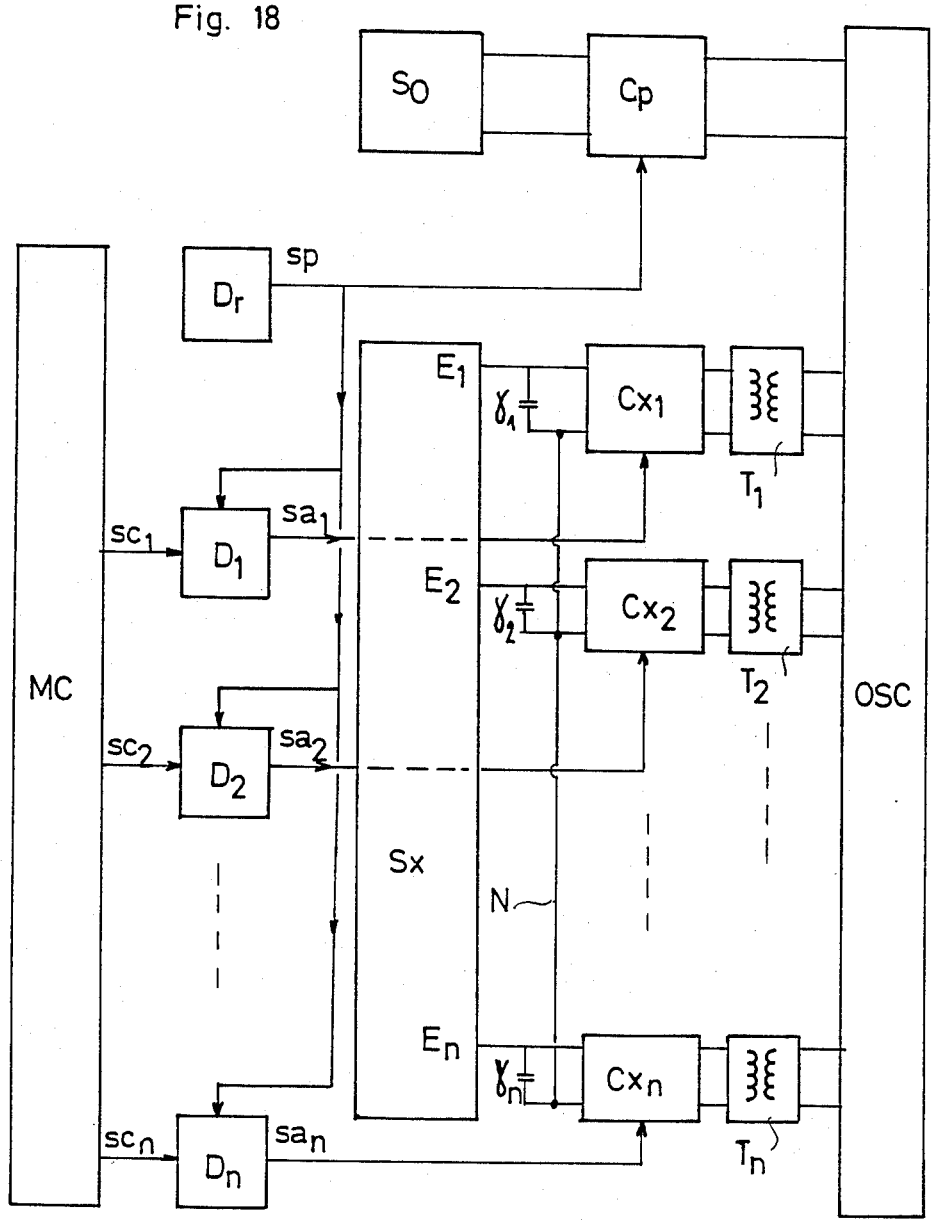
FIGS. 18, 19, and 20 are block diagrams of other embodiments.

The device shown by FIG. 18 controls energy exchanges between two electrical systems comprising on one hand a DC voltage source $S_0$ which is current-reversible and on the other hand a compound generating and/or receiving electrical system $S_x$ with n inputs $E_1$, $E_2 \ldots E_n$.

The kind of electrical system $S_x$ determines its function, illustratively the current-reversible voltage source $S_0$ being a set of storage batteries.

As a very common example, the $S_x$ system is an active or pasive bipolar current-reversible and/or voltage-reversible device. The above stated device then represents a power generator that can impress an arbitrary current or voltage waveshape, DC or AC, to this bipolar machine from the DC source comprising the set of batteries.

If the above bipolar machine is a DC current machine, the power control device under consideration then is a speedvarying device allowing operation of the machine in the four quadrants.

This device also may be illustratively used to rebuild a single- or multi-phase network from a storage battery (emergency set). This list of likely applications of the device under discussion denotes the significance of the device but is not restrictive.

The device includes n+1 controllable converters $C_p$, $Cx_1 \ldots Cx_n$ which are voltage inverters and in the example single-phase ones. The master converter $C_p$ is associated with the source $S_0$ while all the slave converters $Cx_1 \ldots Cx_n$ are associated with the electrical system $S_x$ with n inputs.

Each of the slave inverters $Cx_1 \ldots Cx_n$ is connected on the AC side to a transformer $T_1 \ldots T_n$ and on the DC side is closed by a capacitor $\gamma_1, \ldots \gamma_n$. These n slave inverters $Cx_1 \ldots Cx_n$ are Y-mounted on the DC side and connected in such manner to the system $S_x$ that each of the slave inverters is connected by one of its terminals to the N node of the Y and the other DC terminal is connected to an input $E_1 \ldots E_n$ of the $S_x$ system.

The master inverter $C_p$ is driven by an oscillator $D_r$ of the type already described and with an adjustable frequency, while each of the slave inverters $Cx_i$ is driven by a phase-shifter $D_i$ of the type already descibed which is referred to the oscilltor $D_r$ in order to constrain on this slave inverter a frequency f which is identical with that of the master inverter and a given phase shift (the already mentioned drive signals $sa_1 \ldots sa_n$).

The master inverter $C_p$ in this example is connected directly to the oscillation circuit OSC while the slave inverters $Cx_1 \ldots Cx_n$ are connected to the OSC oscillation circuit through the transformers $T_1 \ldots T_n$; the primary of each of these transformers is connected to one of the above stated inverters whereas all their secondary windings are connected to the oscillation circuit OSC.

The oscillation circuit OSC comprises inductors and capacitors capable of oscillting at the above stated high frequency and of providing temporary energy storage. In particular the oscillation circuit may comprise a series LC circuit itself in series with n secondary windings of the transfomers $T_1 \ldots T_n$ which in turn are interconnected in series (FIG. 20). The OSC oscillation circuit furthermore may also comprise n series of LC oscillation circuits $OSC_1 \ldots OSC_n$ which are all identical. Each one of these oscillation circuits $OSC_1 \ldots OSC_n$ is connected in series with the secondary winding of a transformer $T_1 \ldots T_n$ and is in parallel with the master inverter $C_p$ (FIG. 19).

Each of the phase-shifters $D_1 \ldots D_n$ receives a control signal $sc_1 \ldots sc_n$ from the control unit MC as a function of the desired power exchanges. Illustratively this control unit may comprise n regulators allowing application of the voltages to the DC terminals of each slave inverter $Cx_1 \ldots Cx_n$.

Figure 19:
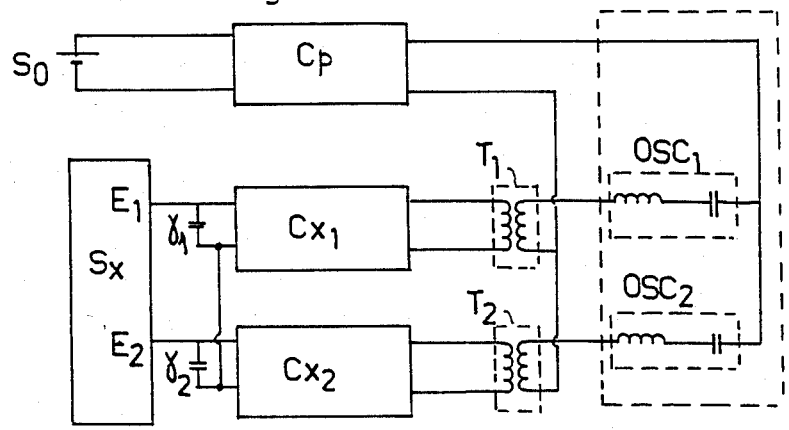
Figure 20:
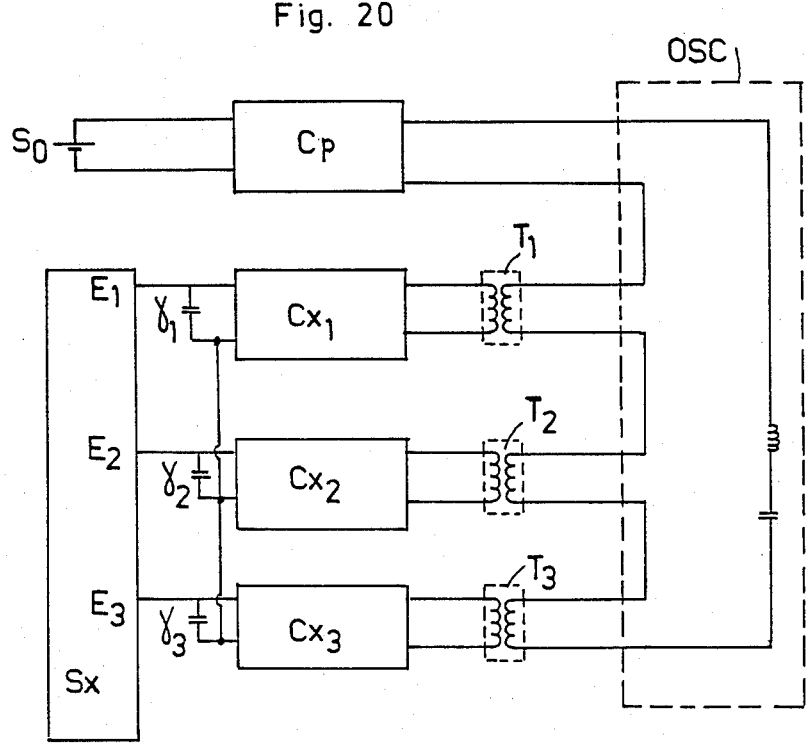

With regard to the device shown in FIGS. 18, 19 and 20, every inverter $C_p$, $Cx_1 \ldots Cx_n$ is single-phased and is provided with at least one pair of semiconducting controllable static switches. As already mentioned, each of these switches is in antiparallel with a diode and may be either of a KA type capable of spontaneous blocking when the current is near zero and of controlled blocking and spontaneous triggering, or of the KB type which allows controlled blocking and spontaneous triggering when the voltage is near zero. The selection of type KA or KB switch essentially depends on one hand on the relative values of the common frequency f and the resonant frequency of the series LC oscillating circuit(s) comprising the OSC oscillation circuit, and on the other hand on the selected ranges of phase-shifting.

FIGS. 19 and 20 as discussed above show two particular embodiments of the device of the invention respectively including two slave converters each associated with a series LC circuit or three slave converters in series with a single series LC circuit. Such assemblies illustratively may find application in emergency units which are single-phase in the former instance and three-phase in the latter.

We claim:

1. A control for regulating the exchanges of energy between at least two generating and/or receiving electrical systems ($S_0, S_1, \ldots S_n$) for controlling the power delivered to or absorbed by said systems according to predetermined conditions, said control comprising at least one static electric energy converter ($C_p, C_a, \ldots C_n$) connected to each of said electrical systems and having a control input for receiving a control signal, each said energy converter being capable of converting the electric values of said systems into electrical frequency and phase values as a function of the control signals, a control phase-shifting circuit (D) connected to the control inputs of said static converters and capable of generating control signals ($s_p, s_a, \ldots sa_n$) for producing at the outputs of said static converters electrical values having a common frequency (f) and relative phases as a function of the control signals received by said phase-shifting circuit, said common frequency being higher than the higher than the highest frequency of any of said systems, said phase-shifting circuit including a reference unit ($D_r$) connected to the control input of one of said converters ($C_p$) comprising a master converter for imposing said common frequency (f) and generating a master control signal (sp) bearing common frequency information (f); and a phase control unit ($D_1, D_2, \ldots D_n$) connected to the other of said converters ($Ca \ldots Ca_n$) comprising slave converters for imposing phase shifts at the outputs of said slave converters with respect to said master converter and generating slave control signals (Sa, ... $Sa_n$) bearing common frequency data and relative phase data an oscillation circuit (OSC) connected to the output of each of said converters and capable of temporarily storing energy and oscillating at said common frequency (f), and control means for said phase shifting circuit for delivering said control signals to said phase shifting circuit as a function of said energy exchanges.

2. A device as in claim 1 and wherein said reference unit ($D_r$) includes an adjustable frequency oscillator for adjusting said common frequency, and wherein said phase control unit includes phase shifters ($D_1, D_2 \ldots D_n$) equal in number to said slave converters ($Ca_1, Ca_2 \ldots Ca_n$), each phase shifter having an associated slave converter.

3. A device as in claim 1 and wherein said oscillation circuit (OSC) comprises a network of coupled inductors and capacitors for oscillating at said common frequency.

4. A device as in claim 1 and wherein said converters comprise semiconducting static switches associated with circuits for initiating switching.

5. A device in claim 4 and wherein said semiconducting switches have outputs connected to with transformers ($T_0, T_1 \ldots T_n$) for providing impedance matching and/or voltage isolation.

6. A device as in claim 1 and wherein each converter ($C_p, Ca_1 \ldots Ca_n$) includes at least one controllable semiconducting static switch provided with a blocking and/or triggering circuit capable of actuating the switch as a function of the drive signal.

7. A device as in claim 1 for controlling the energy exchange between two current-reversible DC voltage sources ($S_0, S_1$), and including two voltage inverters ($C_p, Ca_1$) each having the same number of phases, each being associated with one of said voltage sources, an oscillator ($D_r$) driving one of said inverters ($C_p$) and comprising a master inverter and a phase-shifter ($D_r$) referenced to said oscillator for controlling the other of said inverters ($Ca_1$) comprising a slave inverter, for imposing on said slave inverter a freqency (f) identical with that of the master inverter and a specific phase-shift, a series LC oscillating circuit (OSC) for each inverter phase connecting together the homologuous phases of the two inverters, said circuit having a resonant frequency (fr) of about the same magnitude as the inverter frequency (f), and a control-voltage generator (MC) connected to said phase-shifter ($D_1$) for feeding a control voltage ($sc_1$) as a function of the desired power exchanges between the sources.

8. A device as in claim 7 and wherein said phase shifter ($D_1$) is so configured as to provide in continuous manner a phase shift up to 180° for continuously varying the power provided by one of the sources and absorbed by the other, and being between two limit values, one positive ($P_M$) and the other negative ($P_m$).

9. A device as in claim 8 and wherein said oscillation circuit (OSC) has a resonant frequency (fr) less than the frequency of the inverters, said phase-shifter ($D_1$) is capable of introducing a phase shift between the output voltage of the master inverter ($C_p$) and the output voltage of the slave inverter ($Ca_1$) between $+\pi/2$ and $+3\pi/2$, said master inverter and said slave inverter each comprising at least one pair of semiconducting static controllable switches ($K_1$), each switch being mounted in antiparallel with a diode ($K_d$) and being of a type (KB) capable of spontaneous triggering when its voltage is near zero and of controlled blocking.

10. A device as in claim 8 for regulating the energy exchanges between two DC voltage sources ($S_0, S_1$), one of said sources ($S_1$) having a voltage lower than the other, and wherein said oscillating circuit (OSC) has a resonant frequency (fr) lower than the inverter frequency (f), said phase shifter ($D_1$) comprising means for introducing a phase shift between the output voltage of the master inverter ($C_p$) and the output voltage of the slave inverter ($Ca_1$) of between $-\pi/2$ and $+3\pi/2$, said master inverter ($C_p$) being associated with the higher voltage source ($S_0$) and comprising at least one pair of controllable, semiconducting static switches, each switch being mounted in antiparallel with a diode and being of the (KA) type capable of providing controlled triggering and spontaneous blocking for a current near zero.

11. A device as in claim 8 for regulating energy exchanges between two DC voltage sources ($S_0, S_1$) one of which ($S_1$) has a voltage lower than the other, and wherein said oscillating circuit has a resonant frequency (fr) higher than the inverter frequency (f), said phase shifter ($D_1$) being capable of introducing a phase shift between the output voltage of the master inverter ($C_p$) and the output voltage of the slave inverter ($Ca_1$) between $-\pi/2$ and $+\pi/2$, said master inverter ($C_p$) being associated with the higher voltage source ($S_0$) and comprising at least one pair of semiconducting, controllable static switches, each switch being mounted in antiparallel with a diode and being of the (KA) type capable of spontaneous blocking for a current near zero and of controllable triggering, said slave inverter ($Ca_1$) being associated with the lower voltage source ($S_1$) and comprising at least one pair of semiconducting, controllable static switches, each switch being mounted in antiparallel with a diode of the (KB) type capable of spontaneous triggering when at a voltage near zero and of controllable blocking.

12. A device as in claim 8 and wherein said oscillating circuit has a resonant frequency (fr) higher than the inverter frequency (f), said phase-shifter ($D_1$) comprising means for introducing a phase shift between the output voltage of the master inverter ($C_p$) and the output voltage of the slave inverter ($Ca_1$) between $+\pi/2$ and $+3\pi/2$, said master inverter ($C_p$) and said slave inverter ($Ca_1$) each comprising at least one pair of semiconducting, controllable static switches, each switch being mounted in antiparallel with a type (KA) diode capable of spontaneous blocking when the circuit voltage is near zero and of controlled triggering.

13. A device for regulating the energy exchanges between two current-reversible voltage sources ($S_0, S_1$) and a DC receiving load (R), comprising a master voltage inverter (Cp) and a slave voltage inverter ($Ca_2$), said inverters having the same number of phases and each of said inverters being associated with one of said voltage sources, an oscillator (Dr) driving said master inverter and a phase-shifter ($D_1$) referred to said oscillator and driving said slave inverter for imposing on said slave inverter a frequency (f) identical to the frequency of said master inverter and a specific phase shift, a series LC oscillating circuit (OSC) connected to each phase of each inverter ($C_p, Ca_1$), each of said oscillating circuits having a resonant frequency (fr) of about the same magnitude as the inverter frequency (f), a control voltage generator (MC) connected to said phase shifter ($D_1$) for supplying to said phase shifter a control voltage ($sc_1$) as a function of the desired exchanges between said sources and said load, and a diode rectifier ($C_R$) asspciated with said receiving load (R) and having at its input the same number of phases as the inverters, each phase of said rectifier being Y-mounted with the oscillating circuits connected to the homologous phases of the two inverters.

14. A device as in claim 13 for regulating the energy exchanges between two current-reversible voltage sources ($S_0$, $S_1$) and a DC receiving load (R), comprising two voltage inverters ($C_p$, $Ca_2$) having the same number of phases and each being associated with one of said voltage sources,
   an oscillator ($D_r$) driving one of said inverters ($C_p$) comprising a master inverter and a phase-shifter ($D_1$) referenced to said oscillator and driving the other of said inverters ($Ca_1$) comprising a slave inverter for imposing on said slave inverter a frequency (f) identical with that of the master inverter and a specific phase-shift,
   a series LC oscillating circuit (OSC) connected to each phase of each inverter ($C_p$, $Ca_1$), each of said oscillating circuits having a resonant frequency (fr) of about the same magnitude as the inverter frequency (f),
   a control voltage generator (MC) connected to said phase shifter ($D_1$) for supplying to said phase shifter a control voltage ($sc_1$) as a function of the desired exchanges between said sources and said load, and
   a diode rectifier ($C_R$) associated with said receiving load (R) and having at its input the same number of phases as the inverters, each phase of said rectifier being Y-mounted with the oscillating circuits connected to the homologuous phases of the two inverters.

15. A device as in claim 14 and wherein said phase shifter ($D_1$) includes means for introducing a phase shift in continuous manner over 180° for enabling a continuous variation in the power absorbed by said receiving load and the power generated by said sources between zero and a predetermined maximum value.

16. A device as in claim 15 for regulating the energy exchanges between two identical sources and a receiving load, and wherein the associated oscillating circits for the inverters are all identical.

17. A device as in claim 15, and wherein each of said oscillating circuits has a resonant frequency (fr) lower than the frequency (f) of the inverters ($C_p$, $Ca_1$), said phase shifter ($D_1$) comprising means for introducing a phase shift between the output voltage of the master inverter ($C_p$) and the output voltage of the slave inverter ($Ca_1$) of between 0 and $\pi$,
   said master inverter ($C_p$) and said slave inverter ($Ca_1$) each including at least one pair of semiconducting, controllable static switches, each switch being mounted in antiparallel with a diode and being of the (KB) type capable of offering spontaneous triggering when at a voltage near zero and controlled blocking.

18. A device as in claim 15 and wherein each oscillating circuit has a resonant frequency (fr) higher than the inverter frequency (f),
   said phase shifter ($D_1$) comprising means for introducing a phase shift between the output voltage of said master inverter ($C_p$) and the output voltage of said slave inverter ($Ca_1$) of between 0 and $\pi$, said master inverter ($C_p$) and said slave inverter ($Ca_1$) each comprising at least one pair of semiconducting, controllable static switches, each switch being mounted in antiparallel with a diode and being of the (KA) type providing spontaneous blocking for a current near zero and controlled triggering.

19. A device as in claim 1 for regulating the exchanges of energy between a current-reversible DC voltage source voltage ($S_0$) and a compound electrical generating and/or electrical receiving system ($S_x$) with n inputs ($E_1$, $E_2$...$E_n$) and including a master voltage inverter ($C_p$; associated with said source ($S_0$) and n voltage inverters ($Cx_1$, $Cx_2$...$Cx_n$), each associated with one input of said compund system ($S_x$),
   an oscillator ($D_r$) driving the voltage inverter ($C_p$) and n phase shifters ($D_1$...$D_n$) referenced to said oscillator and driving said slave inverters ($Cx_1$...$C_n$) for imposing on said slave inverters a common frequency (f) identical with that of said master inverter and a specified phase shift,
   an oscillating circuit (OSC) connected to said master inverter ($C_p$) and said slave inverter ($Cx_1$...$Cx_n$) by means of transformers ($T_1$, $T_2$...$T_n$), said transformers being connected by their primary windings to the various inverters and by their secondary windings to the oscillating circuit, said oscillating circuit providing temporary energy storage and being capable of oscillating at said common frequency (f), and
   means (MC) for controlling the phase-shifters ($D_1$...$D_n$) adapted to feed to said phase shifters control signals ($sc_l$...$sc_n$) as a function of the desired exchanges of energy.

20. A device as in claim 19, and wherein on the DC side, each slave inverter ($Cx_1$...$Cx_2$) is closed by a capacitor ($\gamma_1$, $\gamma_2$,...$\gamma_n$),
   said n slave inverters being coupled in a star configuration by their DC terminals, and
   said n inputs ($E_1$...$E_n$) of the electrical system ($S_x$) being connected to the n free apices of the star comprising the inverter coupling.

21. A device as in claim 19 and wherein said oscillating (OSC) comprises a series LC oscillating circuit in series with said drive inverter ($C_p$), and with the n secondary windings of said transformers ($T_1$, $T_2$...$T_n$) being connected in series between them.

22. A device as in claim 19 and wherein said oscillating network (OSC) comprises n identical oscillating series LC circuits ($OSC_l$...$OSC_n$), each said oscillating circuit being connected in series with the secondary winding of a transformer ($T_1$...$T_n$), and
   said n circuits each comprising a transformer secondary winding and an oscillating circuit being mounted in parallel with said master inverter ($C_p$).

23. A device as in claim 19 for controlling the power exchanges between a current reversible DC voltage source ($S_0$) and an electrical sytem ($S_x$) comprising a bipolar device (Sx) which is reversible in voltage and/or current.

24. A device as in claim 19 for controlling the power exchanges between a current-reversible DC voltage source ($S_0$) and a multi-phase electric sytem ($S_x$).

* * * * *